United States Patent [19]

Collins et al.

[11] Patent Number: 4,809,323
[45] Date of Patent: Feb. 28, 1989

[54] TELEPHONE NETWORK INTERFACE APPARATUS

[75] Inventors: Thomas J. Collins, Wall; Anthony L. Nieves, Beach, both of N.J.

[73] Assignee: Keptel, Inc., Tinton Falls, N.J.

[21] Appl. No.: 164,433

[22] Filed: Mar. 4, 1988

[51] Int. Cl.$^4$ .............................................. H04M 9/00
[52] U.S. Cl. ...................................... 379/399; 379/22; 361/356; D14/52
[58] Field of Search .................. 379/399, 397, 27, 26, 379/22, 29, 442, 441, 387; 361/356, 426; 439/133; D13/13, 30; D14/52

[56] References Cited

U.S. PATENT DOCUMENTS 4,741,032 4/1988 Hampton .............................. 379/399
4,748,651 5/1988 Collins et al. .......................... 379/22

OTHER PUBLICATIONS

The 200 Network Interface Unit, "AT&T", 1985.

Primary Examiner—Jin F. Ng
Assistant Examiner—Randall S. Vaas
Attorney, Agent, or Firm—R. Gale Rhodes, Jr.

[57] ABSTRACT

Telephone network interface apparatus for interconnecting a plurality of incoming telephone lines to a plurality of subscriber premises lines and for providing demarcation points therebetween including a multi-line interface plug provided with a plurality of conductors interconnecting the multi-line interface plug with a plurality of subscriber terminals, a multi-line interface jack mounted on a base and provided with a movable member movable into a plurality of different positions, with the movable member in one of the positions and the multi-line interface plug inserted in the multi-line interface jack, all of the plurality of subscriber lines are interconnected with all the incoming telephone lines, and with the multi-line plug removed, a demarcation point provided between one of the subscriber premises lines and one of the incoming telephone lines facilitating a determination of where a fault exists with respect to the one line and with the movable member positioned in another of the positions, a second demarcation point provided between another of the subscriber premises lines and another of the incoming telephone lines facilitating a determination of where a fault exists with respect to the other line, subscriber security means provided on the base means and operable by the subscriber to deny others except telephone company personnel access to at least a portion of the appararatus, and control means for rendering the subscriber security means inoperable by the subscriber when the movable member is in any position other than the one position.

7 Claims, 6 Drawing Sheets

FIG. 6
FIG. 7
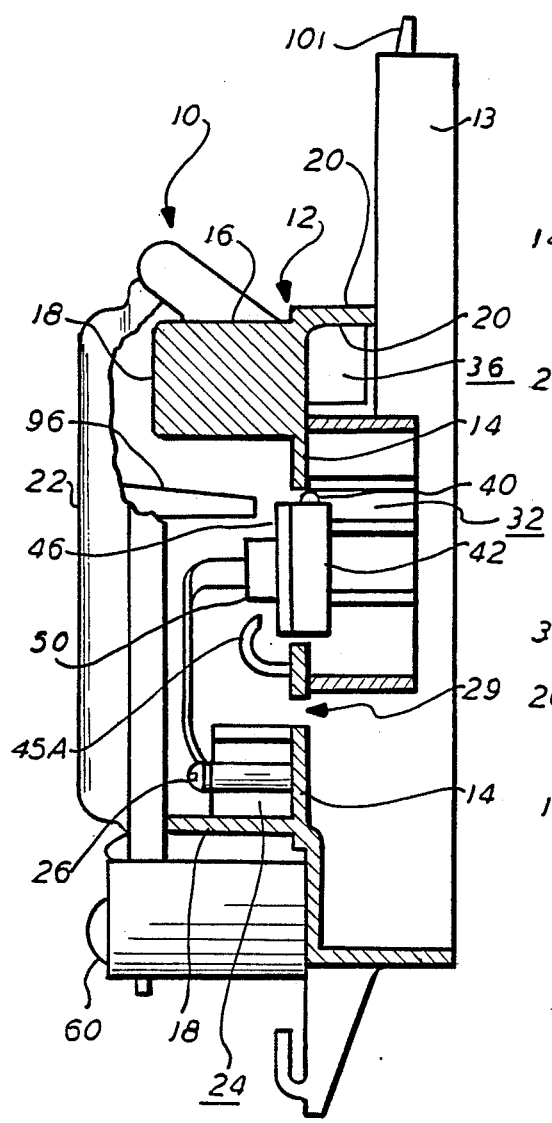
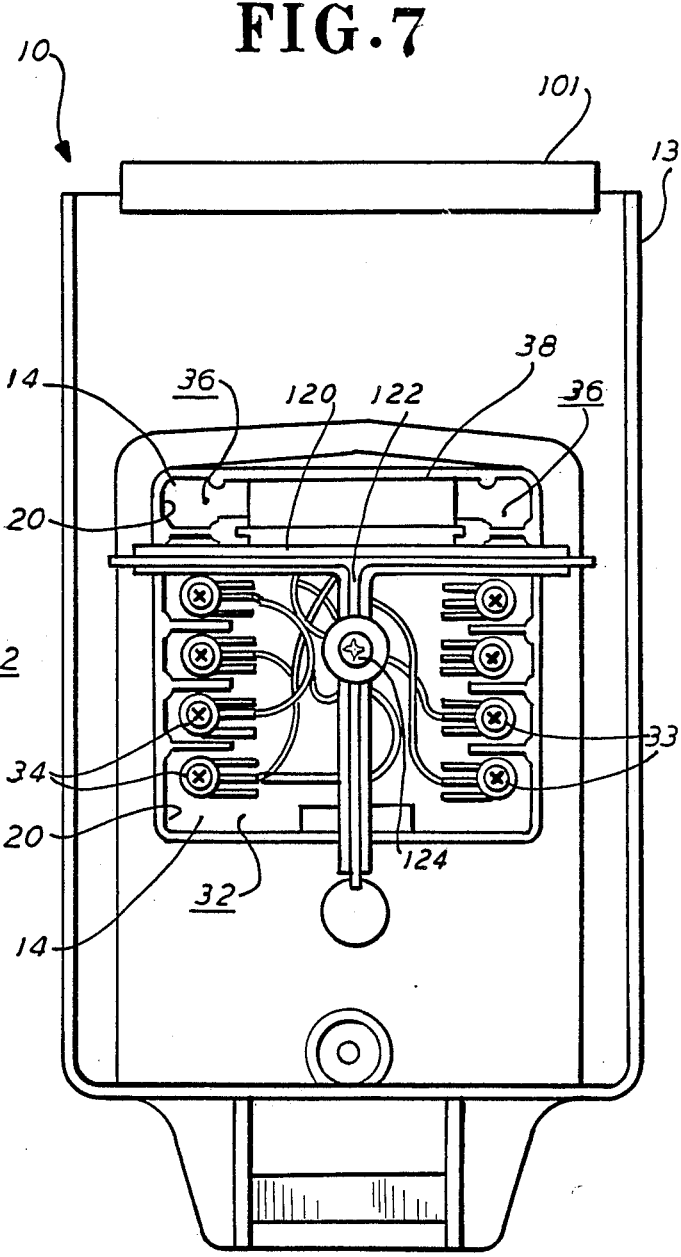

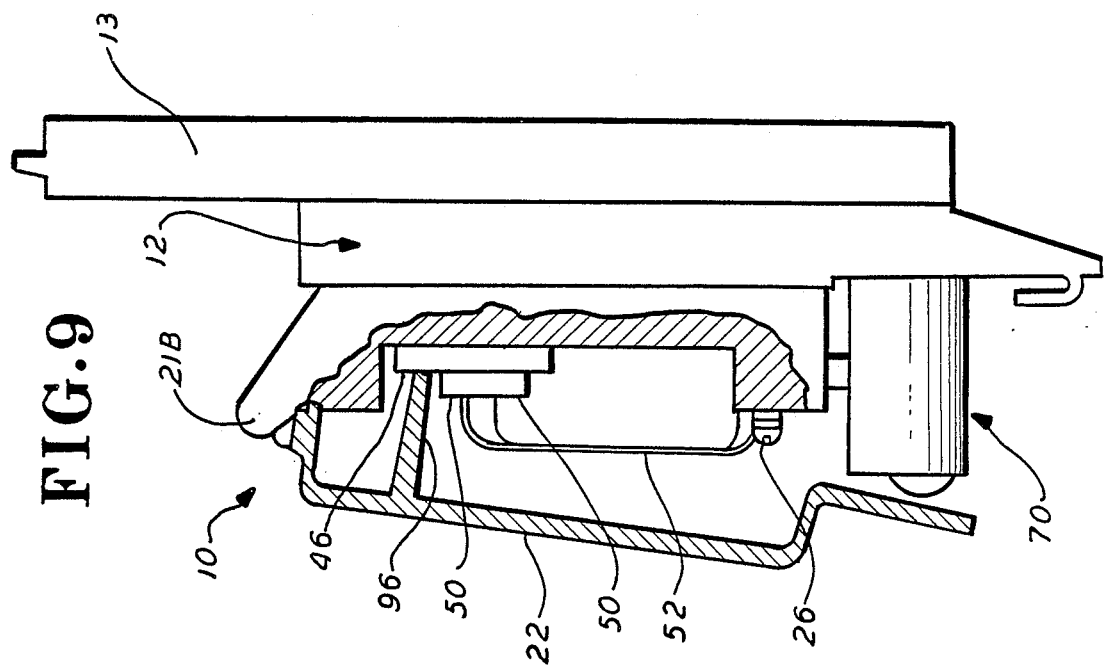
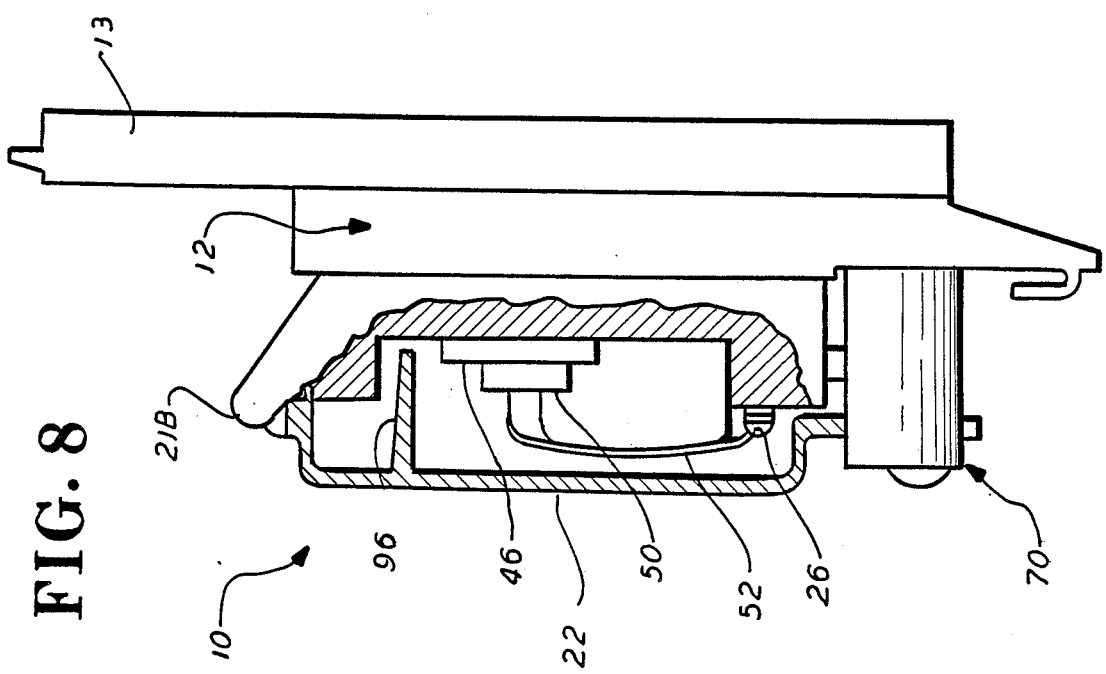

TELEPHONE NETWORK INTERFACE APPARATUS

BACKGROUND OF THE INVENTION

Upon divestiture of the Bell Operating Companies from the American Telephone & Telegraph Company, the Federal Communications Commission mandated that a demarcation point be provided between the subscriber premises line and the incoming telephone line to facilitate determination of whether a fault exists on the subscriber premises line or the incoming telephone line.

Typically, as known to those skilled in the art, such demarcation point is provided by various prior art telephone network interface apparatus typically including an enclosure containing a jack and plug wherein the jack is connected to the incoming telephone line and the plug is connected to the subscriber premises line. Upon the plug being inserted into the jack, an interconnection is made between the subscriber premises line and the incoming telephone line, and upon the plug being removed from the jack the demarcation point is provided and the plug of an operating telephone may be inserted into the jack to facilitate determination of whether a fault exists on the subscriber premises line or the incoming telephone line, i.e., if the operating telephone functions, the fault is determined to be on the subscriber premises line, but if the operating phone fails to function, the fault is determined to exist on the incoming telephone line. Such telephone network interface apparatus is typically provided with subscriber security means for denying others, i.e. other subscribers, except telephone company personnel access to the demarcation point; the typical prior art subscriber security means is a door or cover mounted pivotally on the above-noted enclosure which cover may be fastened, such as by a padlock, to the enclosure.

The operating telephone used for such fault determination is typically referred to in the art as a standard operating phone because it is the telephone most commonly present in the field (e.g. home, office, etc.), namely a telephone for being connected to a single incoming telephone line and therefore is provided with a plug for being connected to the single incoming telephone line. However, non-standard or, as sometimes referred to in the art, special telephones are known and are for connection to at least two incoming telephone lines; such special telephones are provided with a switch or buttons for switching between the two incoming telephone lines. The special telephone also is provided with a special plug for being plugged into a special jack connected to the two incoming telephone lines, and upon insertion of the special plug into the special jack, the special telephone is connected to both incoming telephone lines. Accordingly, there exists a need in the art for telephone network interface apparatus which provides demarcation points between both incoming telephone company lines and both subscriber premises lines.

Disclosed in U.S. patent application Ser. No. 062,089 filed June 12, 1987 and entitled Multi-Line Transmission Line Test Receptacle with Provision for Testing Each Line, now U.S. Pat. No. 4,748,651 is a multi-line test receptacle or multi-line jack for being connected to two incoming telephone lines and for having a multi-line interface plug connected to two subscriber premises lines inserted therein. Such multi-line interface jack is provided with a movable member mounted on the front thereof which may be switched between two different positions referred to as a first or line 1 position and a second or line 2 position. In the first or line 1 position, the multi-line interface jack is for receiving the above-noted special plug of a two line or special telephone whereby the special telephone is connected to both of the incoming telephone lines and may be switched therebetween as also noted above and, upon the movable member being in the first or line 1 position and the special telephone plug removed, the multi-line jack is for receiving the plug of a standard operating telephone to interconnect the standard operating telephone to only one of the two incoming telephone lines to facilitate determination of whether a fault exists on the first incoming telephone line or the first subscriber premises line. Upon the movable member of the multiline interface jack being moved into its second or line 2 position, and upon the plug of the standard operating telephone being plugged into the multi-line jack, the standard operating telephone is connected to the second incoming telephone line to facilitate determination of whether a fault exists on the second incoming telephone line or the second subscriber premises line. It will be understood that patent application Ser. No. 062,089, now U.S. Pat. No. 4,748,651, is incorporated herein by reference as if fully reproduced herein.

It has been discovered that the above-noted Multi-Line Transmission Line Test Receptacle with Provision for Testing Each Line or multi-line interface jack may be incorporated advantageously in telephone network interface apparatus of the type needed as noted above for providing demarcation points between two incoming telephone company lines and two subscriber premises lines; however, upon such incorporation it has been found that control means must be provided to assure that the subscriber security means (e.g. above-noted fastened door or cover) may be operated by the subscriber only upon the movable member of the multi-line interface jack being in the first or line 1 position whereby an associated special (e.g. two line) telephone will be interconnected to both incoming telephone lines. Accordingly, there exists a need in this art for such control means.

As is still further known to those skilled in the art, telephone network interface apparatus of the type referred to generally above typically are provided with telephone company personnel override means for overriding the subscriber security means to permit telephone company personnel to have access to the demarcation point, e.g., jack and plug, upon the subscriber security means being operated and the subscriber being absent, such as out shopping or at the office, or having moved away and forgotten to unlock and remove the padlock. More particularly, as noted above, such prior art telephone network interface apparatus typically includes a subscriber security door which may be padlocked by the subscriber to the telephone network interface apparatus base to which the door is typically pivotally mounted. The typical prior art telephone company personnel override apparatus permits the telephone company personnel to open the subscriber security door while the padlock remains locked. While prior art telephone company personnel override apparatus typically work in a generally satisfactory manner, there still exists a need in the art for more simple and more easily operated override apparatus for overriding the subscriber security apparatus particularly the above-noted subscriber security door for being padlocked to the base of the telephone network interface apparatus.

Prior to divestiture of the Bell Operating Companies referred to above, innumerable prior art telephone service closures, such as the Benner-Nawman #900 Service Closure, were installed in the field for providing interconnections between an incoming telephone line and a subscriber premises line. Such telephone service closures, as known to those skilled in the art, did not provide the later mandated demarcation point, and hence there exists a need in the art for a telephone network interface apparatus which may be mounted to the existing or previously installed telephone service closures to modify the service closure and provide the now mandated demarcation point. As is further known, some existing or previously installed telephone service closures provide an interconnection between two incoming telephone lines and two subscriber premises lines and hence there exists a further need in the art for a telephone network interface apparatus for being mounted to and modifying such two-line telephone service closures to provide demarcation points between both of the two lines.

Still further, there exists a need for telephone network interface apparatus which may be mounted to either one or two-line prior art service enclosures to provide the required demarcation points.

SUMMARY OF THE INVENTION

The object of the present invention is to satisfy the above-noted needs in the art.

Telephone-network interface apparatus satisfying this object and for interconnecting a plurality of incoming telephone lines to a plurality of subscriber premises lines and for providing demarcation points therebetween and for receiving the telephone plug of a standard operating telephone to facilitate determination of whether faults exist on the subscriber premises lines or incoming telephone lines, such telephone plug of said standard operating telephone for being connected to a single incoming telephone line, may include a base, a plurality of subscriber terminals mounted on the base for interconnection with a plurality of subscriber premises lines, a plurality of telephone terminals mounted on the base for interconnection with a plurality of incoming telephone lines, a multi-line interface plug provided with a plurality of conductors interconnecting the multi-line interface plug with the plurality of subscriber terminals, a multi-line interface jack mounted on the base and provided with a movable member movable into a plurality of different positions, the multi-line interface jack interconnected with the plurality of incoming telephone lines, upon said movable member being in one of the positions and the multi-line interface plug being inserted in the multi-line interface jack, the plurality of subscriber lines being interconnected with all of the plurality of incoming telephone lines, upon the movable member being in the one position and the multi-line interface plug being removed from the multi-line interface jack, a demarcation point being provided between one of the subscriber premises lines and one of the incoming telephone lines and upon the telephone plug of the standard operating telephone being inserted in the multi-line interface jack a determination of whether a fault exists on said one subscriber premises line or said one incoming telephone line is facilitated, and upon the movable member being positioned in another of the positions and the multi-line interface plug being removed from the multi-line interface jack, a second demarcation point being provided between another of the subscriber premises lines and another of the incoming telephone lines and upon the telephone plug of the standard operating telephone being inserted in the multi-line interface jack a determination of whether a fault exists on the other subscriber premises line or the other incoming telephone line is facilitated, subscriber security means provided on the base means and operable by the subscriber to deny others except telephone company personnel access to at least the plurality of subscriber terminals, the multi-line interface plug and the multi-line interface jack, and control means provided on the subscriber security means for rendering the subscriber security means inoperable by the subscriber upon the movable member being in any position other than the one position and for allowing the subscriber security means to be operable by the subscriber upon the movable member being in the one position.

Such telephone network interface apparatus may also include telephone company personnel override means mounted on the base for permitting telephone company personnel to override the subscriber security means and provide the telephone company personnel with access to at least the plurality of subscriber terminals, the interface plug and said interface jack.

Further, such telephone network interface apparatus may be mounted to an existing or previously installed telephone service closure to modify the telephone service closure and provide demarcation points betwen one or two incoming telephone lines and one or two subscriber premises lines.

DESCRIPTION OF THE DRAWINGS

FIG. 6 is a generally diagrammatical right side elevational view, in partial cross-section and with some parts broken away, of apparatus embodying the present invention;

FIG. 7 is a rear elevational view of the telephone network interface apparatus embodying the present invention;

FIG. 8 is a right side elevational view, in partial cross-section, of the apparatus of the present invention showing the control member provided on the subscriber security door and the movable member of the multi-line telephone interface jack in the first or line 1 position thereby permitting closure and padlocking of the door; and FIG. 9 is a right side elevational view, in partial cross-section, of the apparatus showing the control member provided on the subscriber security door and the movable member of the multi-line interface jack in a second or line 2 position whereby the control member prevents closure and padlocking of the subscriber security door to the base of the telephone network interface apparatus.

DESCRIPTION OF THE PREFERRED EMBODIMENT

Figure 3:
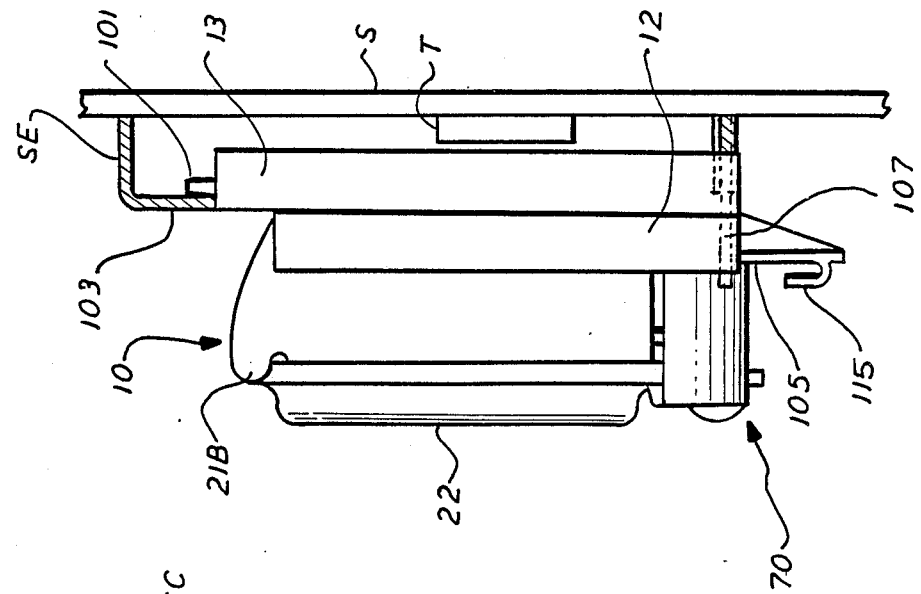
FIG. 3 is a right side elevational view, in partial cross-section, showing an embodiment of the telephone network interface apparatus of the present invention mounted to an existing or previously installed telephone service closure.
Figure 2:
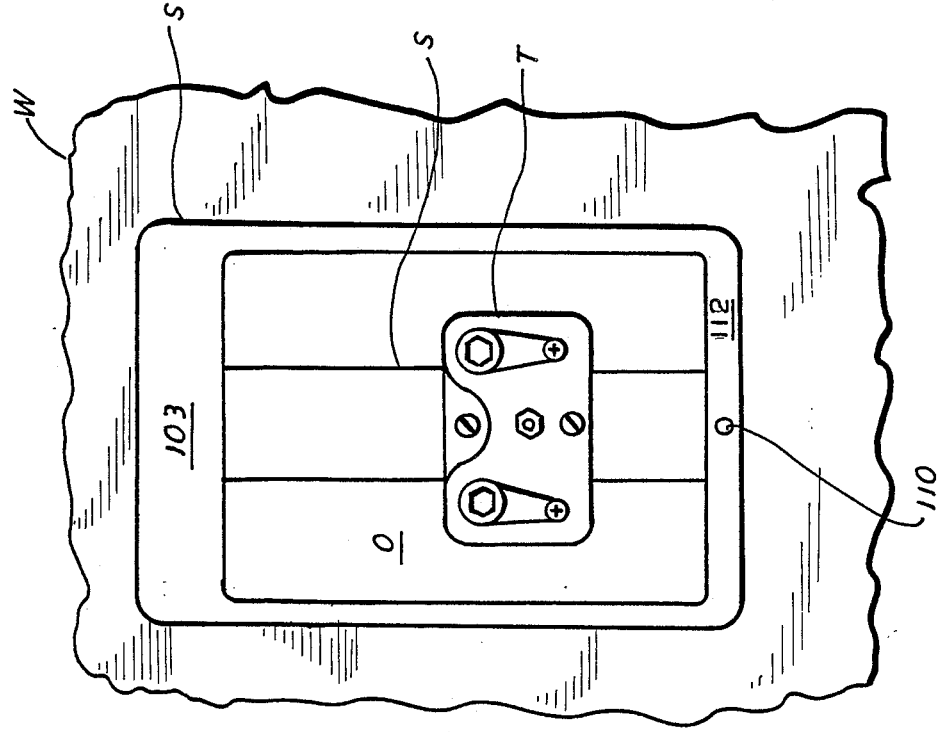
FIG. 2 is a front elevational view of an existing or previously installed telephone service closure with the closure cover removed thereby showing the telephone service closure opening over which an embodiment of the telephone network interface apparatus of the present invention may be mounted.

Referring now to the drawings generally, there is shown telephone network interface apparatus embodying the present invention and indicated by general numerical designation 10. The apparatus includes a base indicated by general designation 12 and which base may be provided with an outwardly extending mounting member 13 for mounting the apparatus 10 to an existing or previously installed prior art telephone service enclosure, e.g. the BennerNawman #900 Service Closure SC shown in FIGS. 2 and 3. The service closure SE is shown mounted to a support such as a wall W; in FIG. 2, the cover, not shown, of the service closure SE has been removed to show the service closure opening O over which the apparatus 10 embodying the present invention may be mounted as shown in FIG. 3. Shown through the opening O in FIG. 2 is a prior art protected terminal block T used to provide an interconnection between an incoming telephone company line and a subscriber premises line; the protected terminal T block is shown mounted to a lath or stud S. Protected terminal block T (FIG. 2) is of the type widely used before the above-mentioned Bell Operating Companies' divestiture, and has no capability for providing the now mandated and above-noted demarcation point. For the purpose of describing the apparatus embodiment 10 of the present invention, it will be presumed that protected terminal block T is for providing interconnections between two incoming telephone company lines and two subscriber premises lines. However, it will be understood that the telephone network interface apparatus of the present invention is not so limited but instead is telephone network interface apparatus of general utility and that the present invention is limited solely by the scope of the appended claims.

Figure 1:
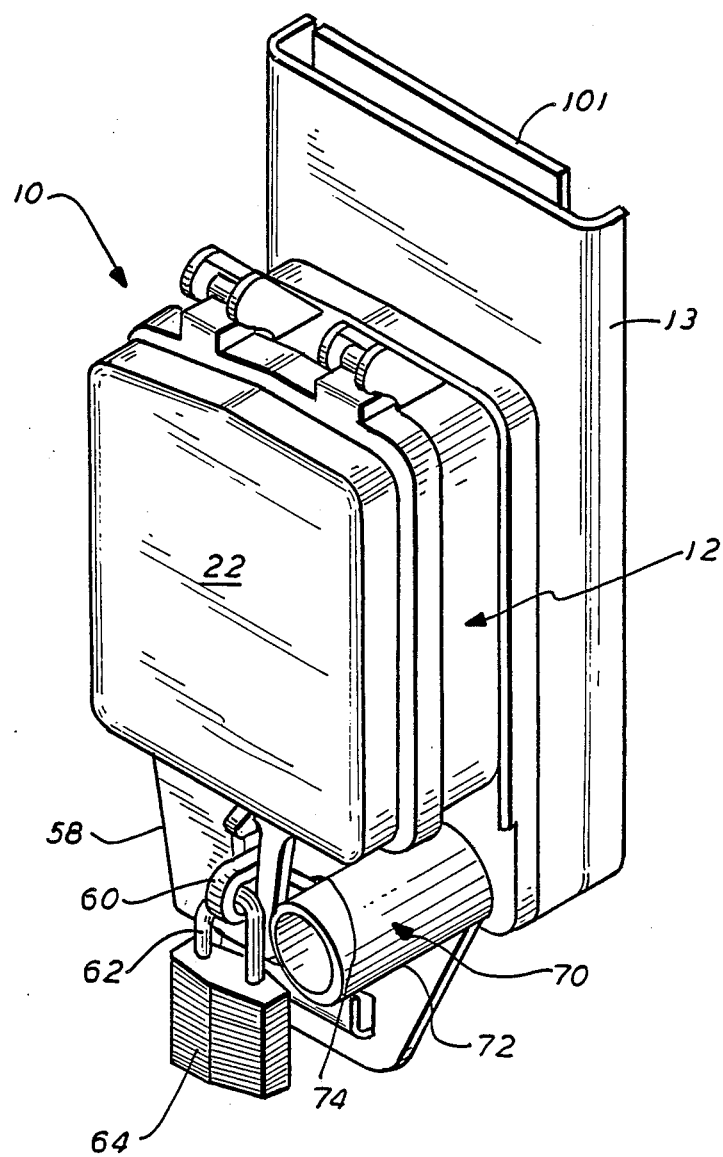
FIG. 1 is a front elevational view, in perspective, of telephone network interface apparatus embodying the present invention and showing the subscriber security door padlocked to the base of the apparatus.
Figure 4:
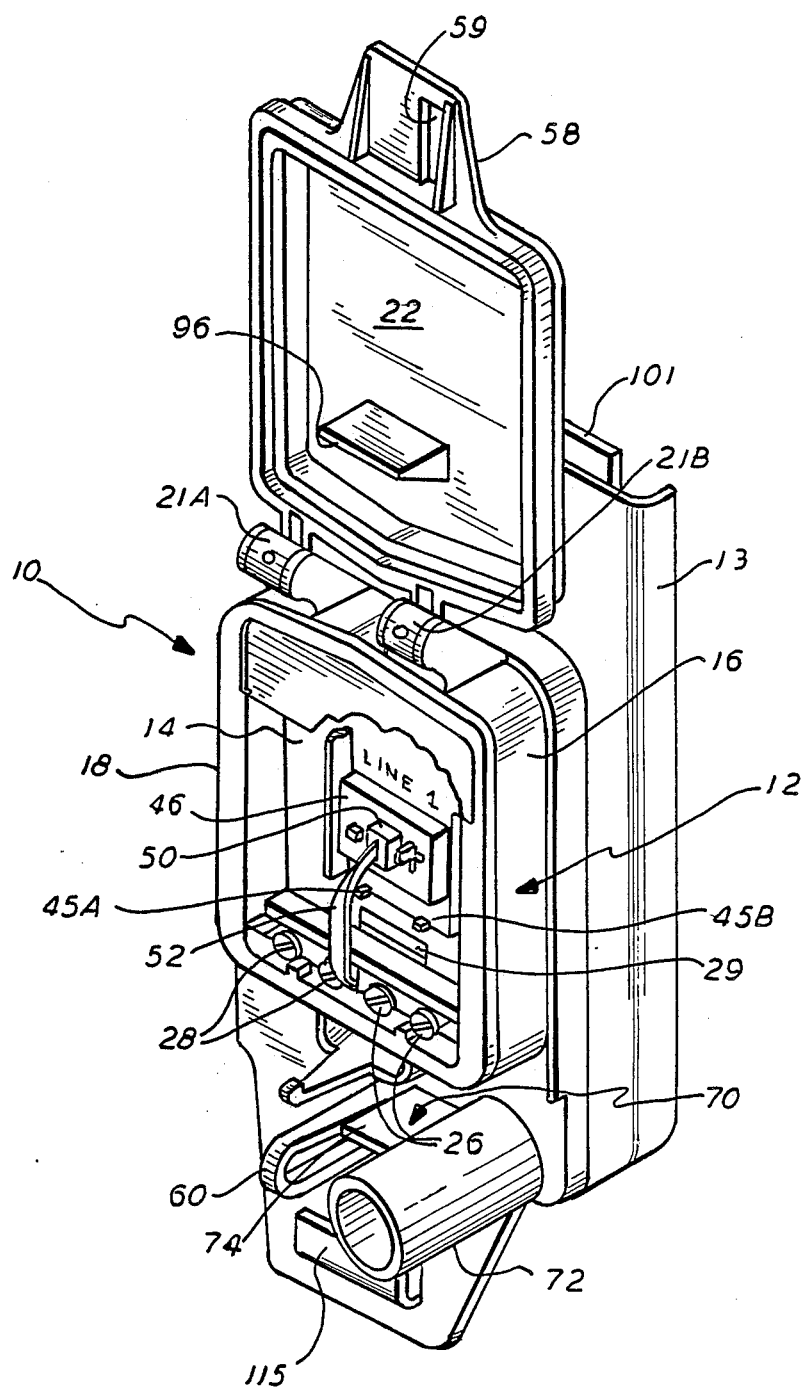
FIG. 4 is a front elevational view, in perspective, of telephone network interface apparatus embodying the present invention and showing showing the subscriber security cover in the open position and showing the movable member of the multi-line telephone interface jack in its first or line 1 position.
Figure 5:
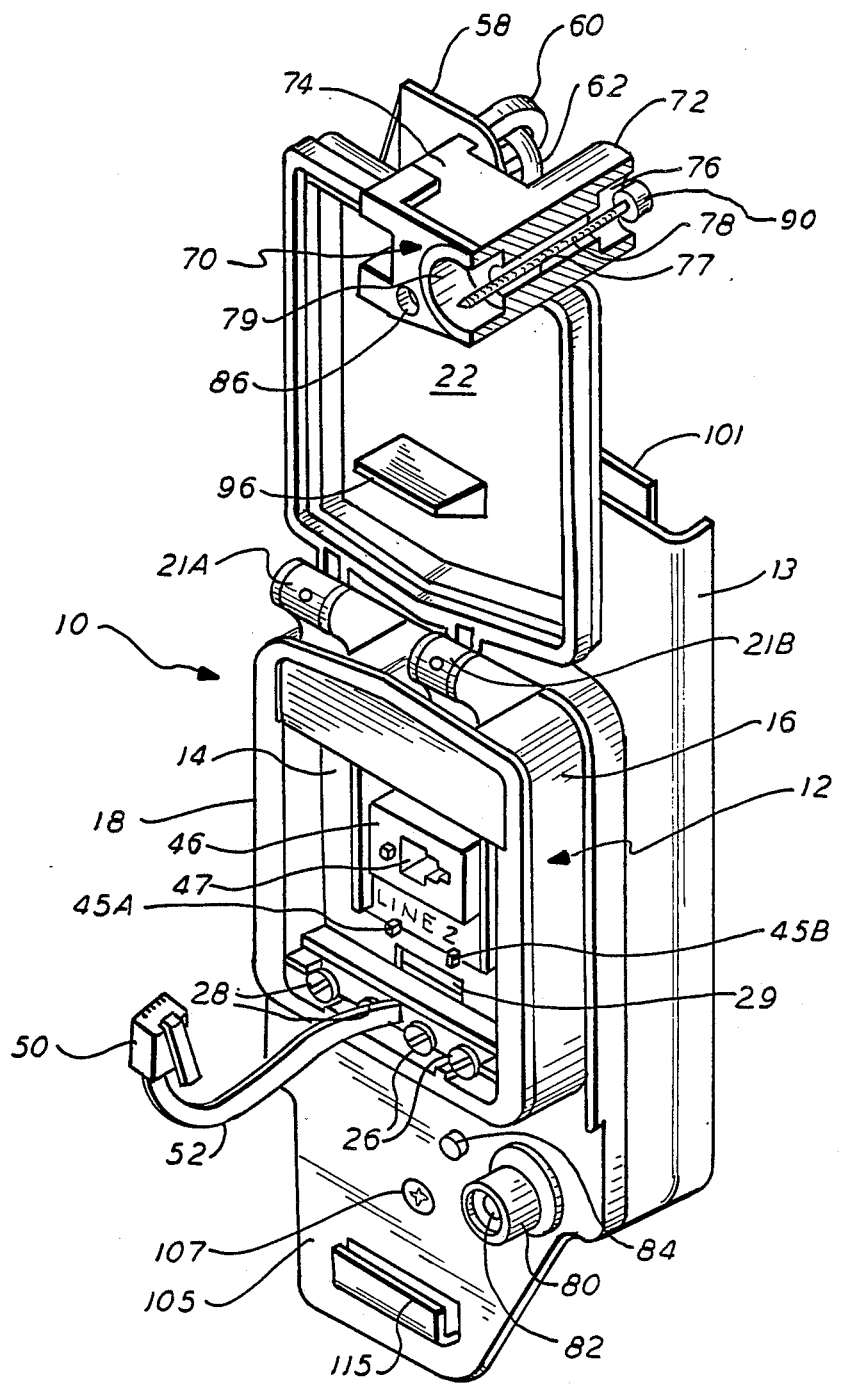
FIG. 5 is a front elevational view, in perspective, of the telephone network interface apparatus embodying the present invention showing the padlocked subscriber security cover overridden by operation of the telephone company personnel override apparatus, and also showing the movable member of the multi-line telephone interface jack in its second or line 2 position.

As may be seen in FIGS. 4, 5 and 6, particularly FIG. 6, base 12 includes a base member 14 circumscribed by a wall 16 which includes a forwardly extending wall portion 18 and a rearwardly extending wall portion 20 (FIG. 6). Mounted pivotally to the top of the forwardly extending wall portion 18 by suitable hinges 21A and 21B (FIGS. 4 and 5) is a subscriber security cover 22 which is for being padlocked to the base 12 by the subscriber as shown in FIG. 1 and as will be described in detail below.

It will be understood from FIGS. 4, 5, 6 and 7, particularly FIGS. 5 and 6, that the base member 14 and forwardly extending wall portion 18 provide a first compartment 24 (FIG. 6) for receiving and having mounted therein two pairs of subscriber terminals 26 and 28 for being connected respectively to two subscriber premises lines (now shown); for facilitation of ready replacement, the subscriber terminals may be embodied as a replaceable subscriber wiring bridge or module removably mounted to the base member 14 by screw (not shown). It will be understood by those skilled in the art that one end of the two subscriber premises lines (not shown) are interconnected to the subscriber premises terminal 26 and 28 by being inserted from the back of the telephone network apparatus 10 through an opening 29 formed in the base member 14 and the other ends of the subscriber premises line are thereafter interconnected to a suitable special jack (not shown) of the type described above for receiving therein the special plug of the special two-line telephone also described above. Further, as may be seen best from FIG. 7, the base member 14 and rearwardly extending wall portion 20 provide a second compartment indicated by general numerical designation 32 for receiving, and having mounted therein, inter alia, two pairs of telephone company terminals 33 and 34 for being interconnected to two incoming telephone company lines (not shown). Still further, and as may be seen best in FIGS. 6 and 7, the base member 14 and rearwardly extending wall portion 20 provide a third compartment 36 for receiving a telephone circuit 38 (FIG. 7), such as a half-ringer, maintenance termination unit or the like, for interconnection by certain of the conductors shown in FIG. 7 to the telephone company terminals in the manner known to those skilled in the art.

Wall member 14, FIG. 6, is provided with a first opening 40 for removably receiving a multi-line, e.g. two line in the present embodiment, interface jack 42 which may be advantageously the above-noted and incorporated herein Multi-Line Transmission Line Test Receptacle with Provision for Testing Each Line, which may be interconnected to the two pairs of telephone company terminals 33 and 34 by certain of the conductors shown in FIG. 7 in the manner taught in the above-noted patent application Ser. No. 062,089, now U.S. Pat. No. 4,748,651, incorporated herein by reference. Multi-line interface jack 42 may be retained in the opening 40 by resilient detent members 45A and 45B as may be seen best in FIGS. 4, 5 and 6; it will be understood that such retention facilitates the multi-line interface jack 42 being a readily replaceable module. Further, multi-line interface jack 42 includes a movable member 46 which may be switched between a first or lower or line 1 position shown in FIG. 4 and a second or upper or line 2 position shown in FIG. 5.

As may be understood best by reference to FIG. 5, the multi-line interface jack 42 including the movable member 46 is provided with a generally centrally formed cavity 47 (FIG. 5) for having inserted therein a multi-line, two line in the present embodiment, interface plug 50 for interconnecting the two incoming telephone company lines with the two subscriber premises lines; multi-line interface plug 50 is interconnected to the two pairs of subscriber premises terminals 26 and 28 by two pairs of conductors indicated generally by numerical designation 52.

It will be understood, and as set forth in detail in the above-noted Multi-Line Transmission Line Test Receptacle with Provision for Testing Each Line, co-pending patent application Ser. No. 062,089, now U.S. Pat. No.

4,748,651 incorporated by reference hereinabove, that upon the movable member 46 of the multi-line interface jack 42 being in its first or lower or line 1 position (FIG. 4), and the multi-line interface plug 50 being inserted therein, both incoming telephone lines and both subscriber premises lines are interconnected. Further, it will be understood that upon the movable member 46 of the multi-line interface jack 42 being in its first or lower or line 1 position, and upon the multi-line interface plug 50 being removed therefrom, a demarcation point is provided between the first incoming telephone company line and the first subscriber premises line and upon the single-line plug of a standard telephone (not shown, but described hereinabove) being inserted in the multi-line interface jack 42, determination of whether a fault exists on the first incoming telephone company line or the first subscriber premises line is facilitated. Still further, it will be understood that upon the movable member 46 of the multi-line interface jack 42 being in its upper or second or line 2 position as shown in FIG. 5, and upon the multi-line interface plug 50 being removed therefrom a second demarcation point is provided between the second incoming telephone company line and the second subscriber premises line, and thereafter, upon the single-line plug of the standard operating telephone described above being inserted therein, determination of whether a fault exists on the second incoming telephone company line or the second subscriber premises line is facilitated.

Referring again to the subscriber security cover 22, and to the FIGS. generally, and FIGS. 1, 4 and 5 particularly, the lower portion of the security cover 22 is provided with an outwardly extending hasp or hasp portion 58 provided with a hasp opening 59 (best seen in FIG. 4) for having the forward or outer portion of a lock staple 60 inserted therethrough to receive the manacle 62 of a padlock 64 (FIG. 1) to permit the subscriber to padlock the cover 22 and to the base 12 and thereby prevent others, except for telephone company personnel in the manner described hereinafter, to have access to the pairs of subscriber premises terminals 26 and 28, multi-line interface jack 42 and multi-line interface plug 50.

To permit the telephone company personnel to override the padlock subscriber security cover 22, the telephone network interface apparatus 10 of the present invention, as may be understood best by reference to FIGS. 1, 4 and 5, is provided with a unitary (i.e. one piece) lock staple and telephone company personnel security member indicated by general numerical designation 70 which is removably fastened to the base 12 as described in detail hereinafter. The unitary member 70 includes the aforementioned lock staple 60 which is of generally inverted U-shape, a generally cylindrically shaped member 72 and an intermediate portion 74 bridging the lock staple 60 and the cylindrically shaped member 72. The cylindrically shaped member 72, as may be seen best in FIG. 5, is provided with a countersunk top portion 76, a centrally formed passageway 77 extending longitudinally therethrough for receiving screw 78, and a countersunk lower portion 79 for receiving the outwardly extending cylindrical member 80, lower portion of FIG. 5, formed on the base 12. Outwardly extending cylindrical member 80 is provided with a centrally formed threaded hole 82 for receiving the screw 78 to removably fasten the unitary member 70 to the base 12; to assure proper registration of the unitary member 70 to the base for proper alignmnt of the lock staple 60 with the opening 59 of the hasp 80, the base may be further provided with an outwardly extending cylindrical member 84 (lower portion of FIG. 5) for receiving the complementarily shaped hole 86 (upper portion of FIG. 5) formed in the bottom of the bridging member 74. The screw 78 includes a head 90, upper portion of FIG. 5, which may be provided with a hexagonally shaped inset top (not shown) for receiving a tool commonly found in the possession of telephone company personnel but not commonly found in the possession of a typical subscriber whereby the security screw 78, generally, may be unfastened from the base 12 by telephone company personnel and not by a subscriber; other suitable security screws also for use with a tool commonly found in the possession of a typical subscriber may be used. Thus, it will be understood, and referring to FIGS. 1 and 5 and first to FIG. 1, that upon the subscriber security cover 22 being padlocked to the base 12 by the padlock manacle 62 being inserted through the staple 60 and locked to the padlock 64, telephone company personnel may unfasten the screw 78 to unfasten the unitary member 70 from the base 12 to open the subscriber cover 22 while the manacle 62 of the padlock 64 remains padlocked through the lock staple 60, as shown in FIG. 5, thereby permitting telephone company personnel to have access to the subscriber terminals 26 and 28 and the demarcation points provided by the multi-line interface jack 42 and multi-line interface plug 50 described above.

Referring again to FIG. 4 and now to FIGS. 8 and 9, it will be understood that upon the subscriber security door 22 being opened by the subscriber as shown in FIG. 4 and the plug 50 being from the multi-line interface jack 42, the subscriber may freely move the movable member 46 of the multi-line interface jack 42 into either the first or line 1 position or the second or line 2 position shown in FIG. 5 and that were the subscriber to inadvertently leave the movable member 46 in the second or line 2 position and re-insert the multi-line interface plug 50 into the multi-line interface jack 42 and thereafter close and fasten the security door 22 to the base 12, the above-noted special or two-line telephone interconnected to the subscriber terminals 26 and 28 would be connected only to one of the incoming telephone lines and not to both incoming telephone lines, obviously an undesirable situation. To prevent such inadvertent leaving of the movable member 46 of the multi-line interface jack 42 in the second or line 2 position and fastening of the subscriber security door 22 to the base 12, and in accordance with the further teachings of the present invention, the subscriber security cover 22 may be provided with a control member for preventing such inadvertence which control member, in the present or preferred embodiment, is the outwardly extending member 96 provided on the inside of the cover 22. As may be understood from FIG. 9, the outwardly extending control member 96 is made sufficiently long such that upon the movable member 46 of the multi-line interface jack 42 being left in the second or line 2 position and upon the subscriber attempting to close and fasten the security cover 22 to the base 12, the member 96 will engage movable member 46 thereby preventing closure of the subscriber security cover 22 but, as may be understood from FIG. 8, upon the movable member 46 of the multi-line interface jack 42 being in the second or line 2 position but instead being in the first or line 1 position, the outwardly extending control member 96 will not engage the movable member 46 thereby permitting the subscriber to close the cover 22 over and fasten the cover to the base 12 by the padlock 64 as described in detail above.

Referring again to FIGS. 1 and 3, it will be further understood and in accordance with the further teachings of the present invention that the outwardly extending mounting member 13 provided on the base 12 is dimensioned to cover the opening O provided in the service enclosure SC and that the upper portion of the member 13 is provided with an outwardly and upwardly extending member 101 for being received behind the upper portion 103 of the telephone service enclosure SC providing the opening O and that the lower portion 105 of the base 12 (FIGS. 3 and 5) may be provided with fastening means such as screw 107 extending therethrough for threadedly engaging the hole 110 formed in the lower portion 112 of the service enclosure SC providing the opening O. The outwardly and upwardly extending member 101 and screw 107 permit the telephone network interface apparatus 10 to be readily mounted to and dismounted from the service enclosure SC.

It will be still further understood in accordance with the teachings of the present invention, that the lower portion 105 of the base 12 may be provided with an outwardly and upwardly extending hanger 115 for hanging the telephone network interface apparatus 10 on the lower portion 112 of the telephone service enclosure SC upon the telephone network interface apparatus 10 being dismounted therefrom and the telephone network interface apparatus 10 being inverted. Such hanging of the telephone network interface apparatus 10 on the telephone service enclosure SC is particularly helpful to telephone personnel since it frees the telephone company personnel to use both hands while working on the terminal block T and this is particularly helpful in installations where the telephone service enclosure SC, and hence the telephone network interface apparatus 10, are at elevated heights requiring, for example, telephone company personnel to be working from a ladder.

Additionally, it will be understood that the telephone network interface apparatus 10 of the present invention may, in the preferred embodiment described above, be embodied as a two-line telephone network interface apparatus or that by leaving the movable member 46 of the multi-line interface jack 42 in the first or line 1 position, it may be used as a one-line telephone network interface apparatus.

In the embodiment shown in the drawings, the telephone network interface apparatus 10 was made from a suitable thermoplastic material and by injection molding in the manner known to those skilled in the art, such as, for example, by injection molding a plurality of component parts for ease of molding and thereafter assembling such parts together; hence, it will be understood that the cross-members 120 and 122 and screw 124 shown in FIG. 7 are for such assembly. Further, the component parts, particularly the perimeter of the subscriber security cover 22 may be molded as shown in FIGS. 4 and 5 so as to overlap the forward portion 18 of the base 12 to provide a weatherproof seal therebetween.

Finally, it will be understood by those skilled in the art that many variations and modifications may be made in the telephone network interface apparatus of the present invention without departing from the spirit and the scope thereof.

What is claimed is:

1. Telephone network interface apparatus for interconnecting a plurality of incoming telephone lines to a plurality of subscriber premises lines and for providing demarcation points therebetween and for receiving the telephone plug of a standard operating telephone to facilitate determination of whether faults exist on the subscriber premises lines or incoming telephone lines, said telephone plug of said standard operating telephone for being connected to a single incoming telephone line, comprising:

base means;

a plurality of subscriber terminals mounted on said base means for interconnection with a plurality of subscriber premises lines;

a plurality of telephone company terminals mounted on said base means for interconnection with a plurality of incoming telephone lines;

a multi-line interface plug provided with a plurality of conductors interconnecting said multi-line interface plug with said plurality of subscriber terminals;

a multi-line interface jack mounted on said base means and provided with a movable member movable into a plurality of different positions, said multi-line interface jack interconnected with said plurality of incoming telephone lines;

upon said movable member being in one of said positions and said multi-line interface plug being inserted in said multi-line interface jack, all of said plurality of subscriber lines being interconnected with all of said plurality of incoming telephone lines;

upon said movable member being in said one position and said multi-line interface plug being removed from said multi-line interface jack, a demarcation point being provided between one of said subscriber premises lines and one of said incoming telephone lines and upon said telephone plug of said standard operating telephone being inserted in said multi-line interface jack a determination of whether a fault exists on said one subscriber premises line or said one incoming telephone line is facilitated;

upon said multi-line interface plug being removed from said multi-line interface jack, and said movable member being positioned in another of said positions, a second demarcation point being provided between another of said subscriber premises lines and another of said incoming telephone lines and upon said telephone plug of said standard operating telephone being inserted in said multi-line interface jack a determination of whether a fault exists on said another subscriber premises line or said another incoming telephone line is facilitated;

subscriber security means provided on said base means and operable by said subscriber to deny others except telephone company personnel access to at least said plurality of subscriber terminals, said multi-line interface plug and said multi-line interface jack;

control means provided on said subscriber security means for rendering said subscriber security means inoperable by said subscriber upon said movable member being in any of said positions other than said one position and for allowing said subscriber security means to be operable by said subscriber upon said movable member being in said one position; and telephone company personnel override means mounted on said base means for permitting telephone company personnel to override said subscriber security means and provide said telephone company personnel with access to at least said multi-line interface plug and said multi-line interface jack.

2. Telephone network interface apparatus according to claim 1 wherein said subscriber security means include a cover mounted pivotally to said base means and for being closed over and fastened to said base means by said subscriber, and wherein said control means include an outwardly extending member provided on the inside of said cover for engaging said movable member of said multi-line interface jack upon said movable member being in any of said positions other than said one position to prevent said cover from being closed over and fastened to said base by said subscriber and upon said movable member of said multi-line interface jack being in said one position said outwardly extending member not engaging said movable member to permit said subscriber to close said cover over and fasten said cover to said base means.

3. Telephone network interface apparatus according to claim 2 wherein said cover includes an outwardly extending hasp provided with a hasp opening for having a lock staple inserted therethrough to receive the manacle of a padlock to permit said subscriber to padlock said cover to said base means, and wherein said telephone company personnel override means include a unitary lock staple and telephone company security member for being fastened to said base means by telephone company personnel to permit said subscriber to padlock said cover to said base means as said and for being unfastened from said base means by said telephone company personnel to permit said telephone company personnel to open said cover while said padlock manacle remains locked through said lock staple thereby providing said telephone company personnel with access to at least said plurality of subscriber terminals, said multi-line interface plug, and said multi-line interface jack.

4. Telephone network interface apparatus according to claim 3 wherein said base means comprise a base member circumscribed by a wall including forwardly and rearwardly extending portions, said forwardly extending wall portion and said base member providing a first compartment for receiving said plurality of subscriber terminals and said multi-line interface plug, said rearwardly extending wall portion and said base member providing a second compartment for receiving said plurality of telephone terminals and also providing a third compartment for receiving a telephone circuit for being interconnected with said subscriber and telephone terminals, and said base member provided with an opening formed generally centrally thereof for receiving and having said multi-line interface jack mounted removably therein, and wherein said cover is mounted pivotally to said forwardly extending portion of said wall.

5. Telephone network interface apparatus according to any one of the preceding claims wherein said apparatus is for being mounted to a previously installed telephone service closure including upper and lower portions defining an opening, and wherein said base means is provided with an outwardly extending mounting member dimensioned to cover said opening and provided with an outwardly and upwardly extending member for being received behind the upper portion of said telephone service closure providing said opening and wherein the lower portion of said outwardly extending mounting member is provided with fastening means for fastening the lower portion of said outwardly extending mounting member to the lower portion of said telephone service closure providing said opening.

6. Telephone network interface apparatus according to claim 5 wherein said apparatus is provided with hanger means for hanging said telephone network interface apparatus on said telephone service closure upon said telephone network apparatus being dismounted therefrom.

7. Apparatus according to claim 3 wherein said unitary lock staple and telephone company personnel security member includes a generally inverted U-shaped member comprising said lock staple, a generally cylindrically shaped member comprising said telephone company personnel security member and an intermediate portion bridging said U-shaped member and said cylindrically shaped member, said cylindrically shaped member having a countersunk top portion and a centrally formed passageway extending longitudinally therethrough for receiving a screw for removably fastening said unitary member to said base means.

* * * * *